US009860152B2

(12) United States Patent
Xia et al.

(10) Patent No.: US 9,860,152 B2
(45) Date of Patent: Jan. 2, 2018

(54) NON-INTRUSIVE METHOD FOR TESTING AND PROFILING NETWORK SERVICE FUNCTIONS

(71) Applicant: Telefonaktiebolaget L M Ericsson (publ), Stockholm (SE)

(72) Inventors: Ming Xia, San Jose, CA (US); Ravi Manghirmalani, Fremont, CA (US); Heikki Mahkonen, San Jose, CA (US); Meral Shirazipour, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 111 days.

(21) Appl. No.: 14/860,564

(22) Filed: Sep. 21, 2015

(65) Prior Publication Data
US 2017/0085459 A1    Mar. 23, 2017

(51) Int. Cl.
H04L 1/00 (2006.01)
H04L 12/26 (2006.01)

(52) U.S. Cl.
CPC .......... H04L 43/12 (2013.01); H04L 43/0852 (2013.01); H04L 43/0876 (2013.01); H04L 43/08 (2013.01)

(58) Field of Classification Search
CPC .. H04L 43/12; H04L 43/0852; H04L 43/0876
(Continued)

(56) References Cited

U.S. PATENT DOCUMENTS 7,472,418 B1 * 12/2008 McCorkendale ....... G06F 21/56
726/24
8,442,043 B2    5/2013 Sharma et al.
(Continued)

FOREIGN PATENT DOCUMENTS

EP    2629463 A1    8/2013
WO    03096729 A1    11/2003

OTHER PUBLICATIONS

"Bloom Filter," Wikipedia, the free encyclopedia, downloaded from http://en.wikipedia.org/wiki/Bloom_filter on Mar. 11, 2015, 16 pages.
(Continued)

*Primary Examiner* — Mang Yeung
(74) *Attorney, Agent, or Firm* — Nicholson De Vos Webster & Elliott, LLP

(57) ABSTRACT

A method is implemented by a network device in a network for monitoring a segment of the network without direct access to an internal configuration or state of the segment. The method includes receiving a request to perform a monitoring task on a monitoring zone within the network. The monitoring zone includes a subset of network devices of the network. The monitoring zone has an ingress data path that carries ingress traffic into the monitoring zone and an egress data path that carries egress traffic out of the monitoring zone. The method further includes configuring the network to mirror the ingress traffic or the egress traffic to a configurable probe in the network and configuring the configurable probe to perform the monitoring task on the monitoring zone, where the configurable probe is configured to perform the monitoring task based on analysis of the mirrored ingress traffic or the mirrored egress traffic.

18 Claims, 8 Drawing Sheets

(58) Field of Classification Search
USPC .......................................................... 370/235
See application file for complete search history.

(56) References Cited

U.S. PATENT DOCUMENTS

| | | | |
|---|---|---|---|
| 2005/0195832 | A1 | 9/2005 | Dharmapurikar et al. |
| 2007/0248006 | A1* | 10/2007 | Gobeil ................... H04L 43/18 370/230 |
| 2009/0143020 | A1* | 6/2009 | Kotabe ............... H04L 12/2697 455/67.11 |
| 2013/0272144 | A1* | 10/2013 | Dong .................. H04L 43/024 370/252 |
| 2014/0098669 | A1 | 4/2014 | Garg et al. |
| 2014/0098678 | A1 | 4/2014 | Lumezanu et al. |
| 2014/0334488 | A1 | 11/2014 | Guichard et al. |
| 2014/0362857 | A1 | 12/2014 | Guichard et al. |
| 2015/0085694 | A1 | 3/2015 | Agarwal et al. |
| 2016/0261638 | A1 | 9/2016 | Xu et al. |
| 2016/0294625 | A1 | 10/2016 | Mahkonen et al. |
| 2016/0294664 | A1 | 10/2016 | Manghirmalani et al. |
| 2017/0048312 | A1* | 2/2017 | Moyer ................ H04L 67/1095 |

OTHER PUBLICATIONS

"OpenFlow Management and Configuration Protocol," Version 1.2, ONF TS-016, OF-CONFIG1.2, Open Networking Foundation, (2014), 44 pages.
"OpenFlow Switch Specification," Version 1.3.0 (Wire Protocol 0x04), ONF TS-006, Open Networking Foundation, (Jun. 25, 2012), 106 pages.
Bloom, Burton H., "Space/time trade-offs in hash coding with allowable errors," Communications of the ACM, vol. 13, No. 7, (Jul. 1970), pp. 422-426.
"Service Function Chaining (sfc)," IETF, downloaded from https://datatracker.ietf.org/wg/sfc/charter/ on Sep. 18, 2015, 4 pages.
Halpern, et al., "Service Function Chaining (SFC) Architecture", IETF Network Working Draft, draft-ietf-sfc-architecture-05, Feb. 17, 2015, 28 pages.
Quinn, et al., "Network Service Header," IETF Network Working Draft, draft-ietf-sfc-nsh-00, Mar. 24, 2015, 42 pages.
U.S. Appl. No. 62/140,932, Expired.
U.S. Appl. No. 14/744,736, Pending.
Ericsson, "NFV Network Monitoring Framework," YouTube, Aug. 17, 2015, [Retrieved from the Internet on Nov. 8, 2016] URL https://www.youtube.com/watch?v=xlkjuaOPsG4, 5 pages.
Mahkonen, et al.,"Elastic Network Monitoring With Virtual Probes," IEEE Conference on Network Function Virtualization and Software Defined Networks (NFV-SDN), 2015, 3 pages.
Xia, M., "NFV Network Monitoring Framework DIAMOND," Ericsson Research Blog, Aug. 26, 2015, [Retrieved from Internet on Nov. 8, 2016] URL https://www.ericsson.com/research-blog/sdn/nfv-network-monitoring-framework-diamond/, 7 pages.

\* cited by examiner

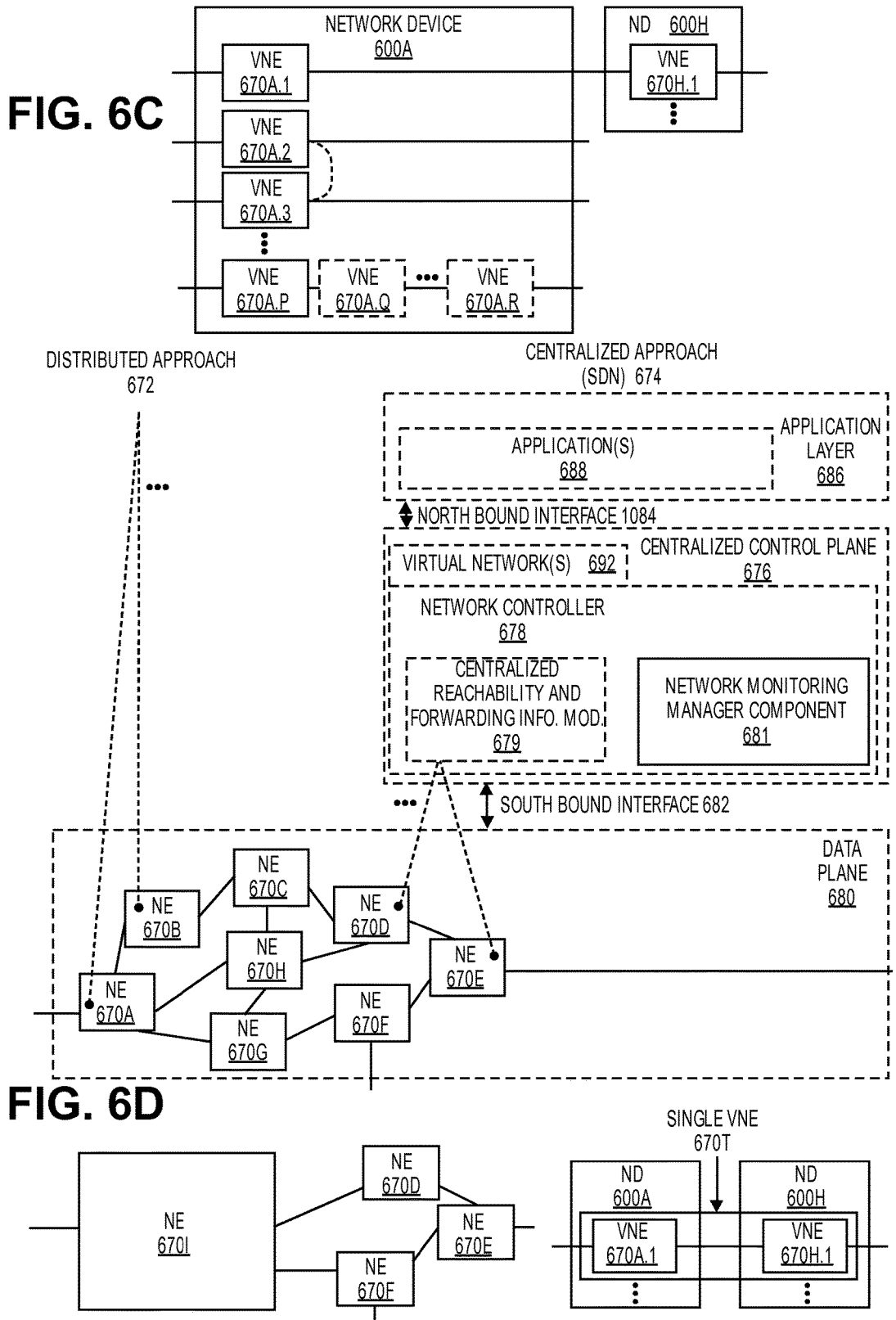

NON-INTRUSIVE METHOD FOR TESTING AND PROFILING NETWORK SERVICE FUNCTIONS

FIELD

Embodiments of the invention relate to the field of network monitoring, and more specifically to an architecture for on-demand network monitoring.

BACKGROUND

There are various reasons why network operators desire to monitor traffic in their networks. One goal of network monitoring is to identify problems in the network, for example, caused by misconfiguration, overloading, or faulty network connections/devices. Network monitoring enables the network operator to characterize the state of the network, the traffic demands, and the actual consumption of network resources. This data allows the network operator to efficiently analyze the network and to respond to any problems that are occurring in the network.

Some network devices have built-in capabilities that collect performance data, generate logs, or trigger alarms in response to detecting certain network events. However, these capabilities are not supported by all network devices and accessing these capabilities often requires support from the equipment vendor. Monitoring solutions available to end user customers typically do not have the same full access rights as the service provider who owns the network infrastructure, and thus may not be able to take the same direct approach to monitor the network (e.g., inspect configuration settings or read system logs). Also, as networks get larger and more complex, it becomes more difficult to maintain adequate network monitoring coverage over a network. Monitoring such large and complex networks impose huge challenges in terms of scalability, controllability, and flexibility.

SUMMARY

A method is implemented by a network device in a network for monitoring a segment of the network without direct access to an internal configuration or state of the segment. The method includes receiving a request to perform a monitoring task on a monitoring zone within the network. The monitoring zone includes a subset of network devices of the network. The monitoring zone has an ingress data path that carries ingress traffic into the monitoring zone and an egress data path that carries egress traffic out of the monitoring zone. The method further includes configuring the network to mirror the ingress traffic or the egress traffic to a configurable probe in the network, configuring the configurable probe to perform the monitoring task on the monitoring zone, where the configurable probe is configured to perform the monitoring task based on analysis of the mirrored ingress traffic or the mirrored egress traffic, and receiving a result of the monitoring task from the configurable probe.

A network device is configured to monitor a segment of a network without direct access to an internal configuration or state of the segment. The network device includes a non-transitory machine-readable storage medium having stored therein a network monitoring manager component and a set of one or more processors coupled to the non-transitory machine-readable storage medium. The set of one or more processors are configured to execute the network monitoring manager component. The network monitoring manager component is configured to receive a request to perform a monitoring task on a monitoring zone within the network. The monitoring zone includes a subset of network devices of the network. The monitoring zone has an ingress data path that carries ingress traffic into the monitoring zone and an egress data path that carries egress traffic out of the monitoring zone. The network monitoring manager component is further configured to configure the network to mirror the ingress traffic or the egress traffic to a configurable probe in the network, configure the configurable probe to perform the monitoring task on the monitoring zone, where the configurable probe is configured to perform the monitoring task based on analysis of the mirrored ingress traffic or the mirrored egress traffic, and receive a result of the monitoring task from the configurable probe.

A non-transitory computer readable medium has computer code stored therein that is to be executed by a set of one or more processors of a network device in a network to monitor a segment of a network without direct access to an internal configuration or state of the segment. The computer code, when executed by the network device, cause the network device to perform operations including, receiving a request to perform a monitoring task on a monitoring zone within the network. The monitoring zone includes a subset of network devices of the network. The monitoring zone has an ingress data path that carries ingress traffic into the monitoring zone and an egress data path that carries egress traffic out of the monitoring zone. The computer code, when executed by the network device, causes the network device to perform further operations including, configuring the network to mirror the ingress traffic or the egress traffic to a configurable probe in the network, configuring the configurable probe to perform the monitoring task on the monitoring zone, where the configurable probe is configured to perform the monitoring task based on analysis of the mirrored ingress traffic or the mirrored egress traffic, and receiving a result of the monitoring task from the configurable probe.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments.

FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 6E illustrates the simple case of where each of the NDs implements a single NE, but a centralized control plane has abstracted multiple of the NEs in different NDs into (to represent) a single NE in one of the virtual network(s), according to some embodiments.

FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

DESCRIPTION OF EMBODIMENTS

Figure 1:
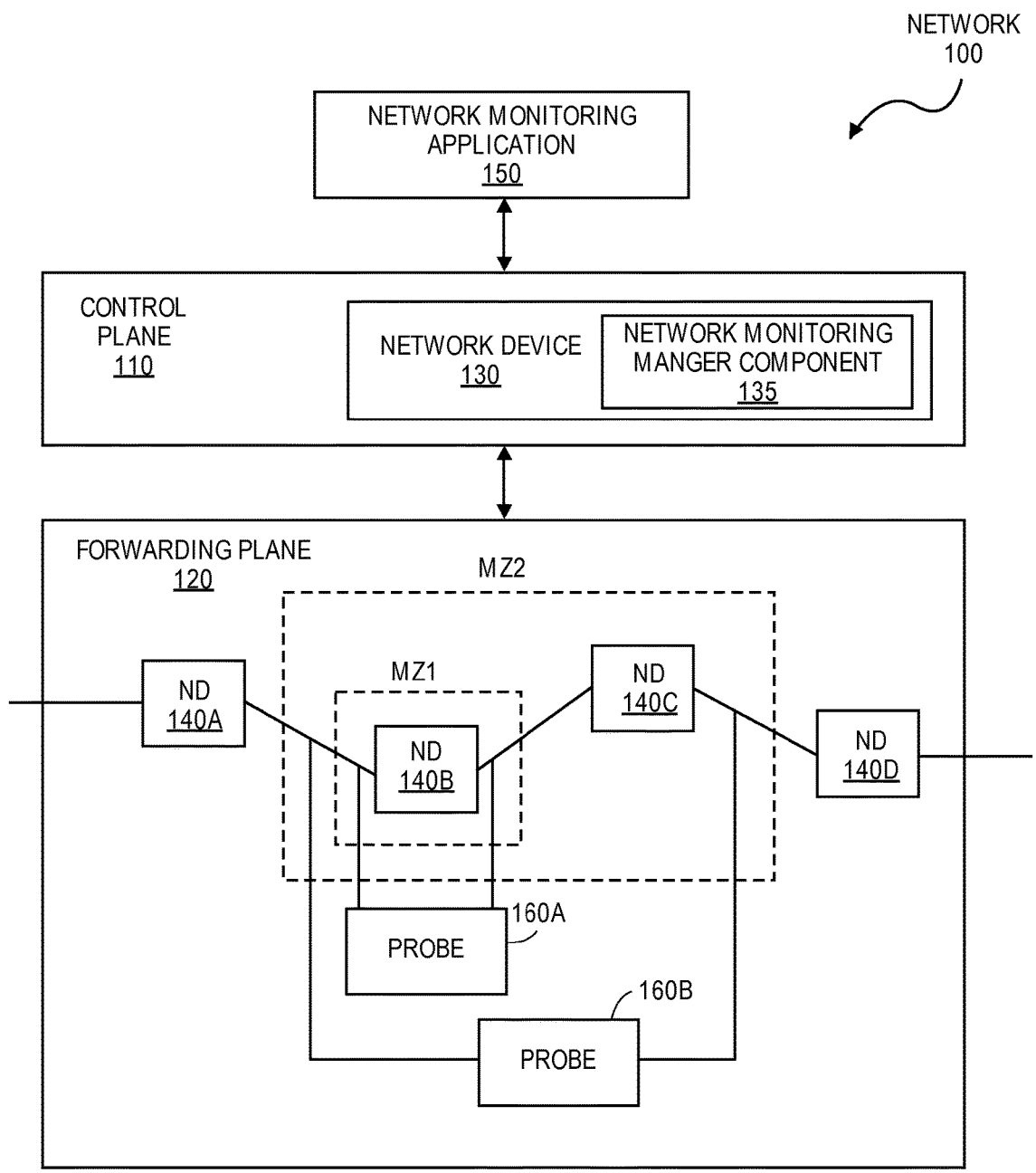
FIG. 1 is a block diagram illustrating a network in which non-intrusive network monitoring can be implemented, according to some embodiments.

The following description describes methods and apparatus for on-demand monitoring of a network segment through the deployment of probes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Embodiments described herein provide techniques for performing non-intrusive on-demand network monitoring. Embodiments employ a probe to monitor the network. A probe can be dynamically deployed in the network and can be configured to perform specific monitoring tasks on a segment of the network. The probe can monitor the network segment without having direct access to the internal configuration or state of the network segment (e.g., without having access to the network function configurations implemented in the segment). This is achieved by mirroring ingress and egress traffic of the network segment to the probe. The probe can perform various monitoring tasks by analyzing the mirrored ingress traffic and/or the egress traffic. In this way, embodiments provide a non-intrusive monitoring technique that has minimal impact on the original data path.

FIG. 1 is a block diagram illustrating a network in which non-intrusive network monitoring can be implemented, according to some embodiments. In the illustrated embodiment, the network 100 includes a control plane 110 and a forwarding plane 120. The control plane 110 includes a network device 130 that executes a network monitoring manager component 135. The network device 130 executes the network monitoring manager component 135 to perform non-intrusive monitoring of the network 100, as described in further detail herein below. The forwarding plane 120 includes network devices 140A-D. Control plane elements (e.g., the network device 130) can configure the network devices 140A-D of the forwarding plane 120 to control traffic routing in the network 100 and to perform other types of network functions. For example, the control plane elements (e.g., network device 130) may implement functionality of a software defined networking (SDN) controller to control traffic routing in the network 100. In one embodiment, control plane elements (e.g., network device 130) can configure forwarding plane elements (e.g., network devices 140A-D) using a control plane communications protocol such as OpenFlow (e.g., OpenFlow 1.3). In one embodiment, the control plane elements (e.g., network device 135) also implement functionality of a cloud manager/orchestrator to instantiate and manage virtual machines, virtual switches, and other virtual resources in the network. Although the control plane 110 is shown as having a single network device 130 and the forwarding plane 120 is shown as having a four network devices 140A-D, it should be understood that the control plane 110 and forwarding plane 120 can each have any number of network devices.

The control plane 110 is communicatively coupled to a network monitoring application 150. In one embodiment, the network monitoring application 150 provides on-demand monitoring as a service (MaaS) to users and/or other applications. The network monitoring application 150 may provide an application programming interface (API) (e.g., a Representational State Transfer (REST) API) that allows a user or another application to request network monitoring services through the API. For example, the requested network monitoring service may be a request to validate that a service chain deployed in the network 100 is functioning as expected. When the network monitoring application 150 receives a request for a network monitoring service (e.g., through the API), the network monitoring application 150 may decompose the requested network monitoring service into a set of discrete monitoring tasks. A monitoring task may be, for example, a network function testing/validation task or a network profiling task. A network function testing/validation task validates that a network function deployed in the network processes network traffic in a manner that is consistent with an expected traffic processing behavior of that network function. An example of a network function testing/validation task is validating whether a traffic blocking function or a traffic passing function deployed in the network 100 behaves as expected. A network profiling task profiles network traffic that flows through the network 100. Examples of network profiling tasks include, but are not limited to, a delay measurement task, a jitter measurement task, and a packet loss measurement task. Each of the monitoring tasks (e.g., network testing/validation tasks and network profiling tasks) may be associated with a monitoring zone (e.g., a network segment) on which the monitoring task should be performed. Each monitoring zone includes a subset (i.e., one or more) of the network devices in the network. For example, as shown, monitoring zone 1 (MZ1) includes a single network device 140B, whereas monitoring zone 2 (MZ2) includes network device 140B and network device 140C. The network devices within a monitoring zone may implement one or more network functions (e.g., traffic blocking function or traffic passing function). Each monitoring zone has an ingress data path that carries ingress traffic into the monitoring zone and an egress data path that carries egress traffic out of the monitoring zone. A monitoring task associated with a given monitoring zone monitors traffic that flows through the given monitoring zone (e.g., traffic that enters the monitoring zone through the ingress data path of the monitoring zone and exits the monitoring zone through the egress data path of the monitoring zone).

In response to receiving a request from the network monitoring application 150 to perform a monitoring task on a monitoring zone, the network device 130 may deploy and/or configure a probe 160 to carry out the monitoring task on the monitoring zone. The probe 160 could be a physical probe or a virtual probe. A physical probe can be an existing network device connected to the monitoring zone that can be configured to perform one or more monitoring tasks. A virtual probe can be a software instance that performs one or more monitoring tasks on demand. A general architecture for a probe 160 is described in more detail with reference to FIG. 2. The network device 130 configures the network 100 (e.g., using OpenFlow) to forward a copy of the ingress traffic into the monitoring zone and/or a copy of the egress traffic out of the monitoring zone to the probe 160. The network device 130 may configure the network 100 to forward all traffic entering and exiting the monitoring zone to the probe 160 or may select a subset of the traffic to forward to the probe 160 (e.g., traffic belonging to specific flows). This allows the probe 160 to be able to observe the traffic that is entering the monitoring zone and the traffic that is exiting the monitoring zone. For example, as illustrated, probe 160A is tapped into the ingress data path and the egress data path of MZ1, indicating that the probe 160A can observe the ingress traffic into MZ1 and the egress traffic out of MZ1. Also, as illustrated, probe 160B is tapped into the ingress data path and egress data path of MZ2, indicating that the probe 160B can observe the ingress traffic into MZ2 and the egress traffic out of MZ2.

A probe 160 may perform a variety of monitoring tasks by analyzing the observed ingress traffic into a monitoring zone and/or the observed egress traffic out of a monitoring zone. The probe 160 may validate whether the network functions within the monitoring zone process traffic as expected based on analyzing the observed ingress traffic into the monitoring zone and the observed egress traffic out of the monitoring zone. The probe 160 can be seen as treating the monitoring zone as a grey box environment (e.g., the expected behavior of the monitoring zone is known, but access to the network functions implemented within the monitoring zone is limited). Also, the probe 160 may measure and collect characteristics of the traffic that flows through the monitoring zone based on analyzing the observed ingress traffic and the observed egress traffic. For example, the probe 160 can measure and collect statistics for the traffic flow through the monitoring zone such as delay, jitter, packet loss, and other types of statistics. In one embodiment, delay and jitter can be measured based on analyzing timestamps associated with traffic that flows through the monitoring zone. In one embodiment, packet loss can be measured by using counters to count traffic that flows through the monitoring zone. The probe 160 has minimal impact on the original data path of the traffic through the monitoring zone and does not require direct access to the internal configuration or state of the monitoring zone (e.g., configuration of network functions within the monitoring zone). Thus, the probe 160 monitors the network 100 in a non-intrusive manner. The probe 160 may send the results of the monitoring tasks to the network device 130, which can in turn report the results to the network monitoring application 150. These results can be made available to the end user or another application (e.g., through an API) for further analysis or corrective action (e.g., if the monitoring task detected an abnormality in the network 100).

Figure 2:
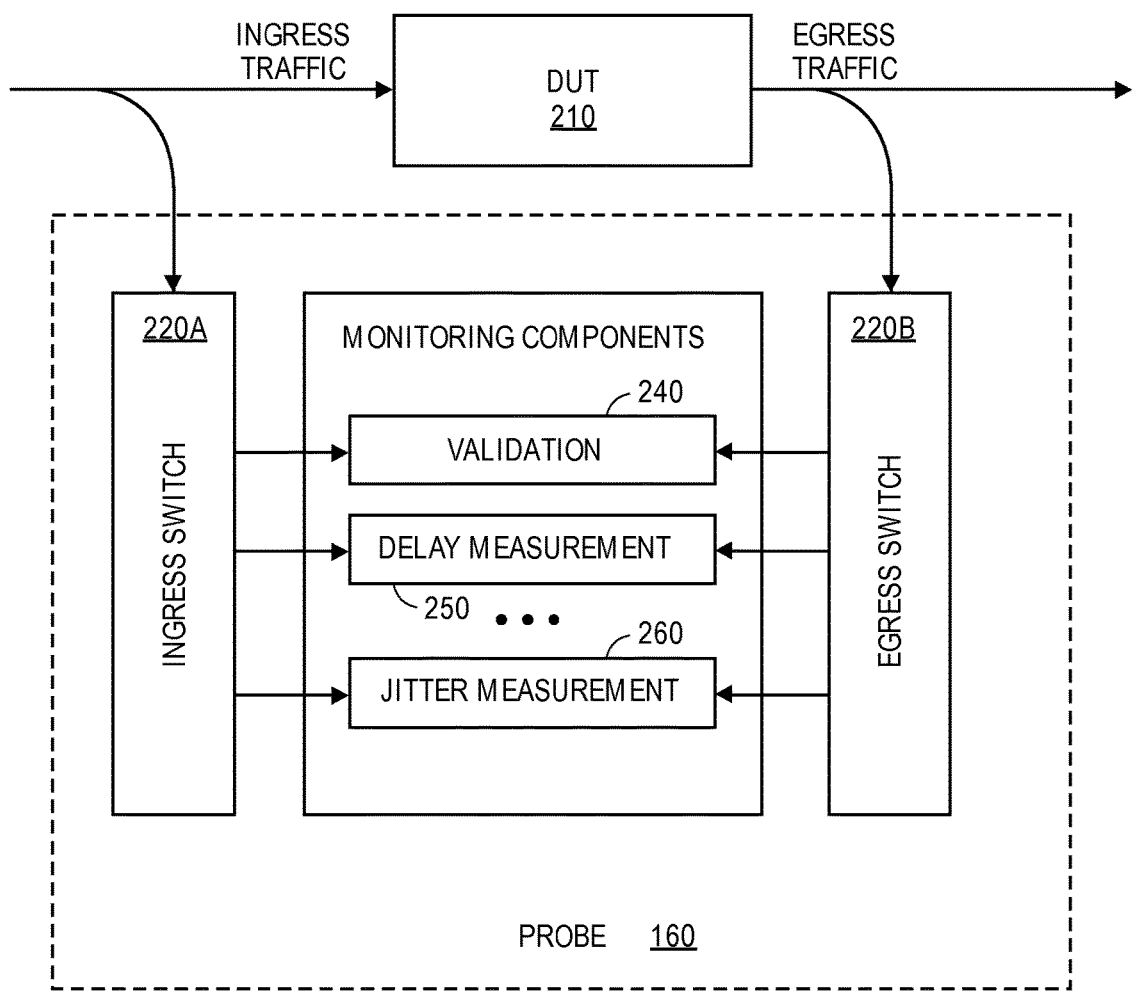
FIG. 2 is a block diagram illustrating an architecture for a probe, according to some embodiments.

FIG. 2 is a block diagram illustrating an architecture for a probe, according to some embodiments. The probe 160 is configured to monitor a DUT 210 (e.g., a monitoring zone). The probe 160 includes an ingress switch 220A and an egress switch 220B. The ingress switch 220A and the egress switch 220B can be implemented as a single physical switch (that acts as both the ingress switch 220A and the egress switch 220B), as two separate physical switches (e.g., one switch acts as the ingress switch 220A and the other switch acts as the egress switch 220B), as one or more virtual switches (e.g., Open vSwitches) executed by a network device in the network 100), or as switching functionality within the probe 160 itself. The ingress switch 220A receives a copy of the ingress traffic into the DUT 210, thus allowing it to observe the ingress traffic into the DUT 210. The egress switch 220B receives a copy of the egress traffic out of the DUT 210, thus allowing it to observe the egress traffic out of the DUT 210. In one embodiment, the DUT 210 represents a network device 140 that is being monitored. In another embodiment, the DUT 210 represents a monitoring zone that includes multiple inter-connected network devices 140 that form a segment of a network 100. The ingress switch 220A and the egress switch 220B can redirect their respective observed traffic into one or more monitoring components such as a validation component 240, a delay measurement component 250, and a jitter measurement component 260 or other type of monitoring components. As such, the probe 160 can include multiple parallel data paths to different monitoring components. Each of the monitoring components can perform a given monitoring task by analyzing the observed ingress traffic and/or the observed egress traffic. In one embodiment, a monitoring component can be implemented in hardware that is configured to perform a monitoring task. For example, a monitoring component can be hardware configured for deep packet inspection (DPI) for layer 4-7 profiling. In one embodiment, a monitoring component can be implemented as a software instance configured to perform a monitoring task. In one embodiment, the software instance can be executed on a network device that supports network function virtualization (NFV). In one embodiment, the software instance can be executed in a cloud environment. A monitoring component implemented as a software instance can be virtually turned on or off on-demand. Any of the data paths from the switches 220 to the monitoring components can be turned off when the monitoring task associated with that monitoring component is not being performed. The various monitoring components of the probe 160 are shown by way of example and not limitation. It should be understood that the probe 160 can implement other types of monitoring components and that the probe 160 can implement any number of monitoring components 230. The probe 160 is illustrated with a dotted line to indicate that the various components of the probe 160 (e.g., ingress switch 220A, egress switch 220B, and the various monitoring components) need not be co-located or implemented by the same device. In some embodiments, the various components of the probe 160 may be implemented in a distributive manner across the network 100. A probe that includes one or more virtualized components (e.g., virtual switch or software instance executed on a network device that supports NFV), is referred to herein as a virtual probe.

Figure 3A:
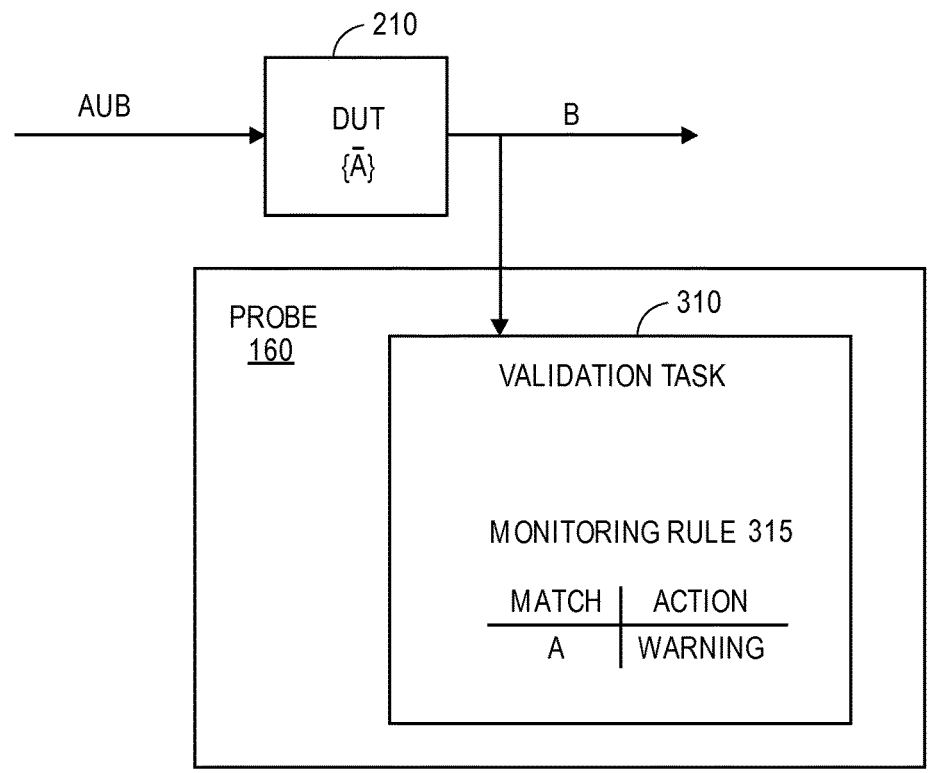
FIG. 3A is a block diagram illustrating a probe that is configured to validate traffic blocking functionality implemented by a DUT, according to some embodiments.

FIG. 3A is a block diagram illustrating a probe that is configured to validate traffic blocking functionality implemented by a DUT, according to some embodiments. As shown, the probe 160 is tapped into the egress data path of the DUT 210. The DUT 210 is expected to implement a blocking function (e.g., firewall or network address translation (NAT)) that blocks all traffic in set A. The notation {$\overline{A}$} indicates that the DUT 210 is to block traffic in set A. The probe 160 is configured to perform a validation task 310 that validates that the actual traffic processing behavior of the DUT 210 matches an expected traffic processing behavior of the DUT 210. The validation task 310 may be a task that is performed by the validation component 240 of the probe 160. By way of example, suppose that the DUT 210 receives two non-overlapping sets of ingress traffic, set A and set B (notated as A∪B). According to the expected traffic processing behavior of the DUT 210, the DUT 210 should block traffic in set A and thus output only traffic in set B. Based on this known expected traffic processing behavior of the DUT 210, the probe 160 can be configured with one or more monitoring rules 315 to validate that the actual traffic processing behavior of the DUT 210 matches the expected traffic processing behavior of the DUT 210. Since the probe 160 is tapped into the egress data path of the DUT 210, it receives a copy of the traffic exiting the DUT 210. The probe 160 may validate that the DUT 210 processes traffic as expected by matching the observed traffic exiting the DUT 210 against one or more monitoring rules 315. In one embodiment, a monitoring rule 315 includes a match field and a corresponding action field. The match field includes a match criteria for matching packets. In one embodiment, the match criteria matches a packet based on inspection of header fields in the packet. For example, the match criteria can match a packet based on five header fields of the packet such as the protocol (e.g., TCP or UDP), source IP address, source port, destination IP address, and destination port. The match criteria may use other fields and any combination of fields of a packet to identify traffic. The action field includes an action to perform when a packet matches the match criteria. When the probe 160 detects a packet that matches the match criteria in the match field of a monitoring rule 315, the probe 160 executes the corresponding action in the action field of the monitoring rule 315. In this example, the probe 160 is configured with a monitoring rule 315 that has a match criteria that matches traffic in set A and a corresponding action that triggers a warning. If the probe 160 observes traffic exiting the DUT 210 that matches set A, this means that the DUT 210 did not completely block traffic in set A, and thus is not processing traffic according to its expected traffic processing behavior. In this case, the probe 160 triggers a warning that the DUT 210 is not processing traffic as expected.

Figure 3B:
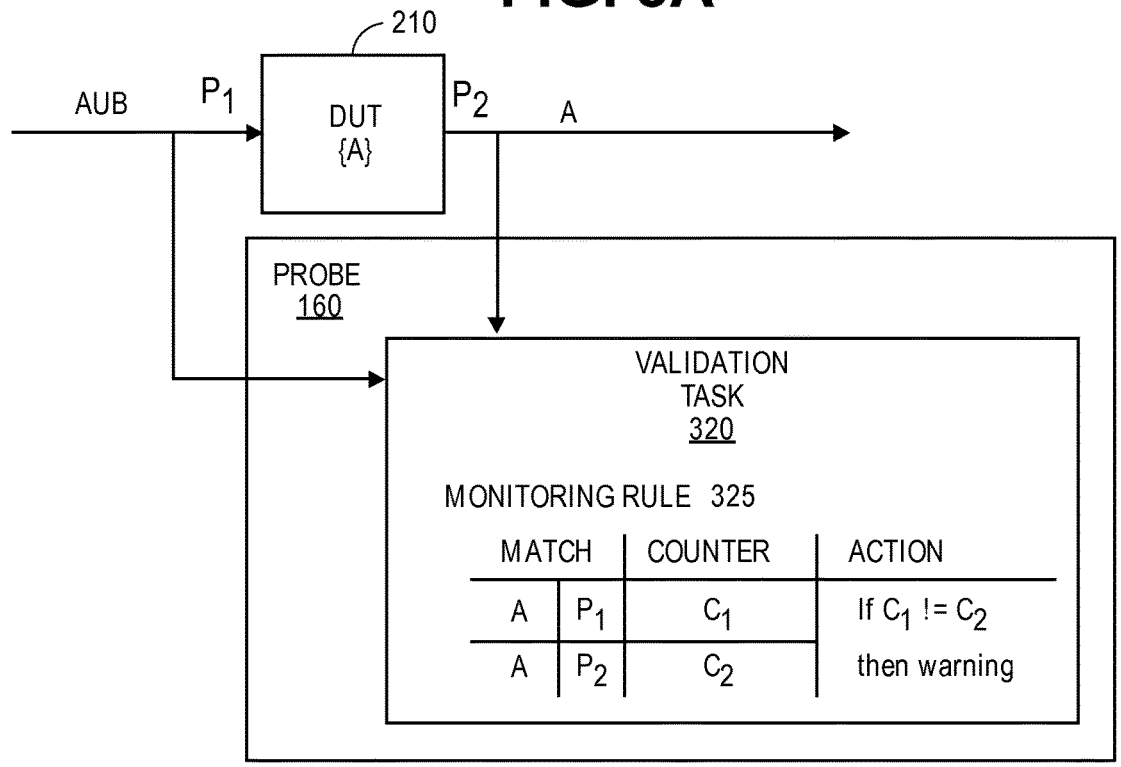
FIG. 3B is a block diagram illustrating a probe that is configured to validate traffic passing functionality implemented by a DUT, according to some embodiments.

FIG. 3B is a block diagram illustrating a probe that is configured to validate traffic passing functionality implemented by a DUT, according to some embodiments. As shown, the probe 160 is tapped into both the ingress data path and the egress data path of the DUT 210. The DUT 210 is expected to implement a traffic passing function (e.g., firewall or NAT) that passes traffic in set A (and block other traffic). The notation {A} indicates that the DUT 210 is to pass traffic in set A. The probe 160 is configured to perform a validation task 320 that validates that the actual traffic processing behavior of the DUT 210 matches an expected traffic processing behavior of the DUT 210. The validation task 320 may be a task that is performed by the validation component 240 of the probe 160. By way of example, suppose that the DUT 210 receives two non-overlapping sets of ingress traffic, set A and set B (notated as A∪B). According to the expected traffic processing behavior of the DUT 210, the DUT 210 should only pass traffic in set A and block traffic in set B. Based on this known expected traffic processing behavior of the DUT 210, the probe 160 can be configured with one or more monitoring rules 325 to validate that the actual traffic processing behavior the DUT 210 matches the expected traffic processing behavior of the DUT 210. Since the probe 160 is tapped into both the ingress data path of the DUT 210 and the egress data path of the DUT 210, it receives a copy of both the traffic entering the DUT 210 and a copy of the traffic exiting the DUT 210. The probe 160 may validate that the DUT 210 processes traffic as expected by matching the observed traffic entering the DUT 210 and the observed traffic exiting the DUT 210 against one or more monitoring rules 325. In this example, the probe 160 is configured with a monitoring rule 325 that keeps track of a counter (c1) that counts the total amount of traffic in set A observed at the ingress port (P1) of the DUT 210 and that also keeps track of a counter (c2) that counts the total amount of traffic in set A observed at the egress port (P2) of the DUT 210. The monitoring rule 325 also specifies an action to trigger a warning if there is a mismatch between counters c1 and c2 (i.e., c1 is not equal to c2). If there is a mismatch between c1 and c2, this means that the DUT 210 did not pass some of the traffic in set A, and thus is not processing traffic according to its expected traffic processing behavior. In this case, the probe 160 triggers a warning to indicate that the DUT 210 is not processing traffic as expected.

Figure 4A:
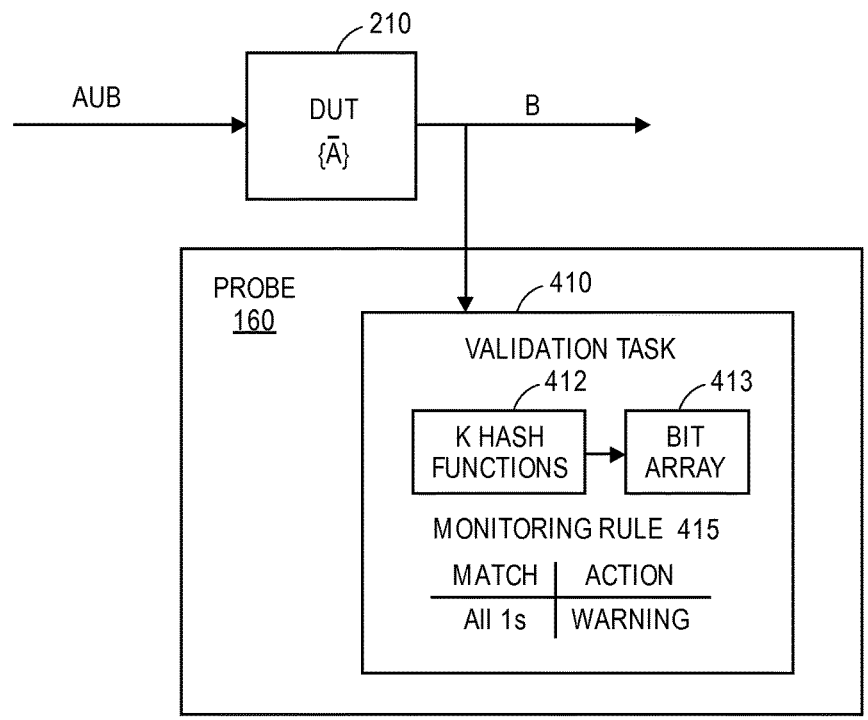
FIG. 4A is a block diagram illustrating a probe that is configured to validate traffic blocking functionality implemented by a DUT, where the probe uses a bloom filter to consolidate monitoring rules, according to some embodiments.

FIG. 4A is a block diagram illustrating a probe that is configured to validate traffic blocking functionality implemented by a DUT, where the probe uses a bloom filter to consolidate monitoring rules, according to some embodiments. In the case that the probe 160 has a large number of monitoring rules, matching traffic against all of the monitoring rules can be computationally expensive. This imposes limitations on the scalability of probes 160 to monitor network traffic. Thus, in one embodiment, the probe 160 employs a hash based group membership (GM) data structure (e.g., bloom filter, Cuckoo, etc.) to consolidate monitoring rules. A hash based GM data structure is a space-efficient probabilistic data structure that is used to test whether an element is a member of a set. False positive matches are possible, but false negatives are not. Thus, a query to a GM data structure has a 100 percent recall rate. In other words, a query returns either "possibly in the set" or "definitely not in the set." In the case of bloom filters, elements can be added to the set, but not removed. Other GM data structures (e.g., Cuckoo) allow elements to be removed from the set. In general, the probability of false positives increases as more elements are added to the set. Consolidating monitoring rules using a hash based GM data structure provides a more scalable and efficient way to implement monitoring rules, while still maintaining controllable accuracy. In the following descriptions, an example of consolidating monitoring rules using a bloom filter will be described. It should be noted, however, that monitoring rules can be consolidated using GM data structures other than a bloom filter.

An empty bloom filter is a bit array of m bits, all set to "0". There are k different hash functions defined, each of which maps or hashes an element to one of the m array positions with a uniform random distribution. To add an element, the k hash functions are applied on the element to get k array positions. The bits at these positions are set to "1". To query for an element (i.e., determine whether the element is in the set), the same k hash functions are applied on the element to get k array positions. If any of the bits at these positions is set to "0", the element is definitely not in the set—if it was in the set, then all the bits at these positions would have been set to "1" when the element was inserted. If all the bits at these positions is set to "1", then either the element is in the set or the bits have by chance been set to "1" during the insertion of other elements, resulting in a false positive. In a simple bloom filter, there is no way to distinguish between the two cases, but more advanced techniques can address this problem. Removing an element from a bloom filter is not possible because false negatives are not permitted. If an element maps to k bits, setting each of those k bits to "0" suffices to remove the element, but also may result in removing other elements that happen to map onto any of the removed bits. Thus, setting any of the bits to "0" could introduce the possibility for false negatives.

The bloom filter is implemented using an m-bit array and k independent hash functions. A match criteria for traffic is added to the bloom filter by k-hashing packet fields that identify the traffic and setting the resulting array positions to "1" in the bit array. In one embodiment, k-hashing is applied to pre-determined fields of the packet header. For example, k-hashing functions can be applied to a digit string that is created by concatenating a numeric representation of the protocol (e.g., UDP="1", TCP="2", etc.), source IP address (e.g., 192.168.0.50="192168050" or any source address="0000"), source port (e.g., port 50="50" or all ports="0"), destination IP address (e.g., 192.168.0.51="192168051" or any destination IP address="0000"), and destination port (e.g., port 51="51" or all ports="0") in the packet header. Each of the k hash functions will map the digit string to a position in the bit array. The match criteria is added to the bloom filter by setting these positions in the bit array to "1".

As mentioned above, the bloom filter can generate false positives (e.g., a packet that is not in set A can be determined to be a match). The false positive rate can be calculated as $(1-e^{-kn/m})^k$, where k is the number of hash functions, n is the number of rules to be consolidated, and m is the size of the bit array. Each of these parameters can be configured or pre-negotiated as desired (e.g., by the network device 130 and/or the probe 160).

Similar to the probe 160 illustrated in FIG. 3A, the probe 160 illustrated in FIG. 4A is configured to perform a validation task 410 that validates that the DUT 210 blocks traffic in set A. The validation task 410 may be a task that is performed by the validation component 240 of the probe 160. The probe 160 is tapped into the egress data path of the DUT 210 and thus receives a copy of the traffic exiting the DUT 210. The probe 160 uses a bloom filter to determine whether the observed traffic exiting the DUT 210 matches traffic in set A. For the bloom filter to match traffic in set A, a match criteria that matches traffic in set A should be added to the bloom filter. A match criteria that matches traffic in set A can be added to the bloom filter by k-hashing (using k hash functions 412) pre-determined packet header fields that identify traffic in set A and setting the resulting bit positions in the bit array 413 to "1". Additional match criteria for other sets of traffic can be added to the same bloom filter in a similar manner. In this way, the bloom filter can be used to consolidate multiple monitoring rules.

For each packet that the probe 160 receives, the probe 160 can use the bloom filter to determine whether the packet is a match. This is done by k-hashing the pre-determined packet header fields of the received packet using k hash functions 422, which results in one or more bit positions. If all of these bit positions are set to "1" in the bit array 413, this indicates that the packet is a match. When the probe 160 determines that the packet is a match, the corresponding action for the match is executed, according to a monitoring rule. In this example, the bloom filter was previously configured to match packets that belong to set A. The probe 160 is configured with a monitoring rule 415 to trigger a warning if the bloom filter detects a match ("all 1s" in the bit array 413). Thus, if the probe 160 receives traffic that is in set A, the probe 160 will use the bloom filter to determine that the packet is a match and trigger a warning. In this way, the probe 160 is able to validate that the DUT 210 processes traffic as expected. Traffic monitoring performance is improved compared to a probe 160 that does not perform consolidation because the probe 160 can use the bloom filter to quickly determine whether an incoming packet is a match, without the need to check the incoming packet against a long list of monitoring rules.

Figure 4B:
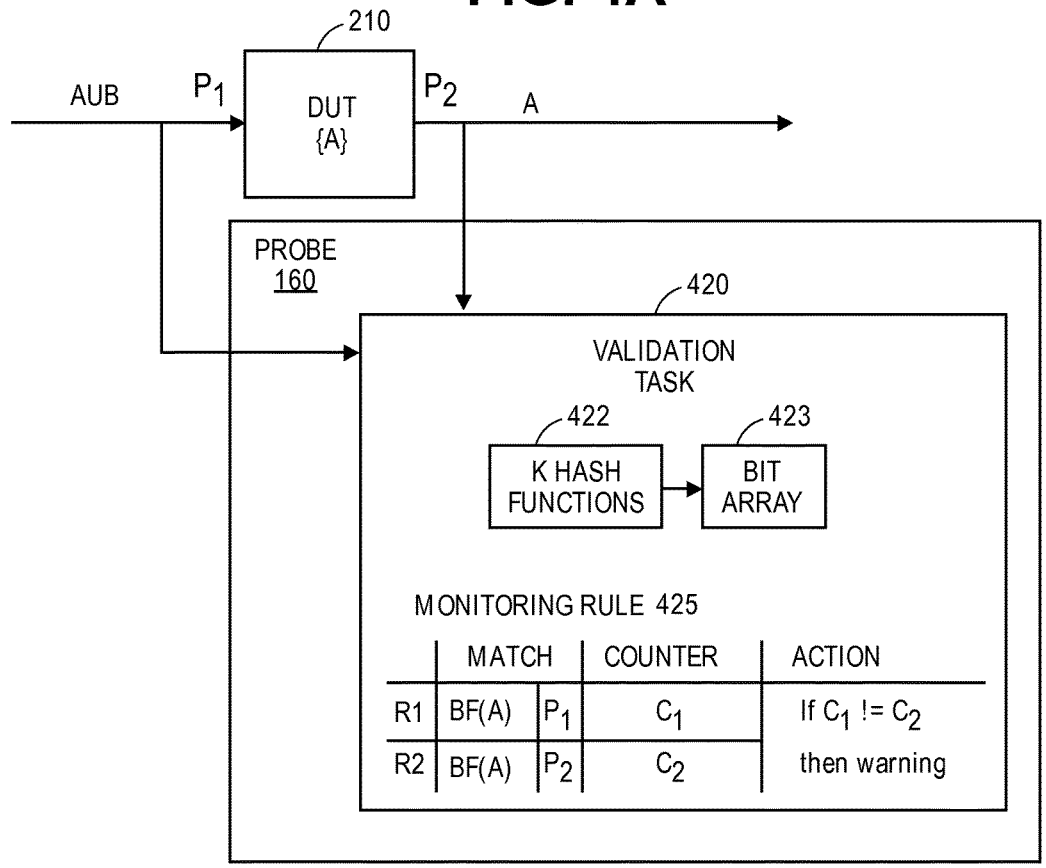
FIG. 4B is a block diagram illustrating a probe that is configured to validate traffic passing functionality of a DUT, where the probe uses a bloom filter to consolidate monitoring rules, according to some embodiments.

FIG. 4B is a block diagram illustrating a probe that is configured to validate traffic passing functionality of a DUT, where the probe uses a bloom filter to consolidate monitoring rules, according to some embodiments. Similar to the probe 160 illustrated in FIG. 3B, the probe 160 illustrated in FIG. 4B is configured to perform a validation task 420 that validates that the DUT 210 passes traffic in set A. The validation task 420 may be a task that is performed by the validation component 240 of the probe 160. The probe 160 is tapped into both the ingress data path and the egress data path of the DUT 210. Thus, the probe 160 receives a copy of both the traffic entering the DUT 210 and a copy of the traffic exiting the DUT 210. The probe 160 uses a bloom filter to determine whether the observed traffic entering the DUT 210 matches traffic in set A and whether the traffic exiting the DUT 210 matches traffic in set A. As previously discussed, match criteria can be added to the bloom filter by k-hashing (using k hash functions 422) predetermined packet header and fields and setting the resulting bit positions in the bit array 423 to "1". The same bloom filter can be used to match other sets of traffic, thus allowing consolidation of multiple match criterion.

For each packet the probe 160 observes at the ingress data path of the DUT 210, the probe 160 can use the bloom filter to determine whether the packet is a match (using techniques similar to those described above). If the probe 160 determines that the packet is a match, then a corresponding counter (c1) is increased. Similarly, for each packet the probe 160 observes at the egress data path of the DUT 210, the probe 160 can use the bloom filter to determine whether the packet is a match. If the probe 160 determines that the packet is a match, then a corresponding counter (c2) is increased. The probe 160 is configured with a monitoring rule 425 to trigger a warning if there is a mismatch between c1 and c2 (i.e., c1 is not equal to c2). In this way, the probe 160 is able to validate that the DUT 210 processes traffic as expected. Traffic monitoring performance is improved compared to a probe 160 that does not perform consolidation because the probe 160 can use the bloom filter to quickly determine whether a packet is a match, without the need to check the incoming packet against a long list of monitoring rules.

Figure 5:
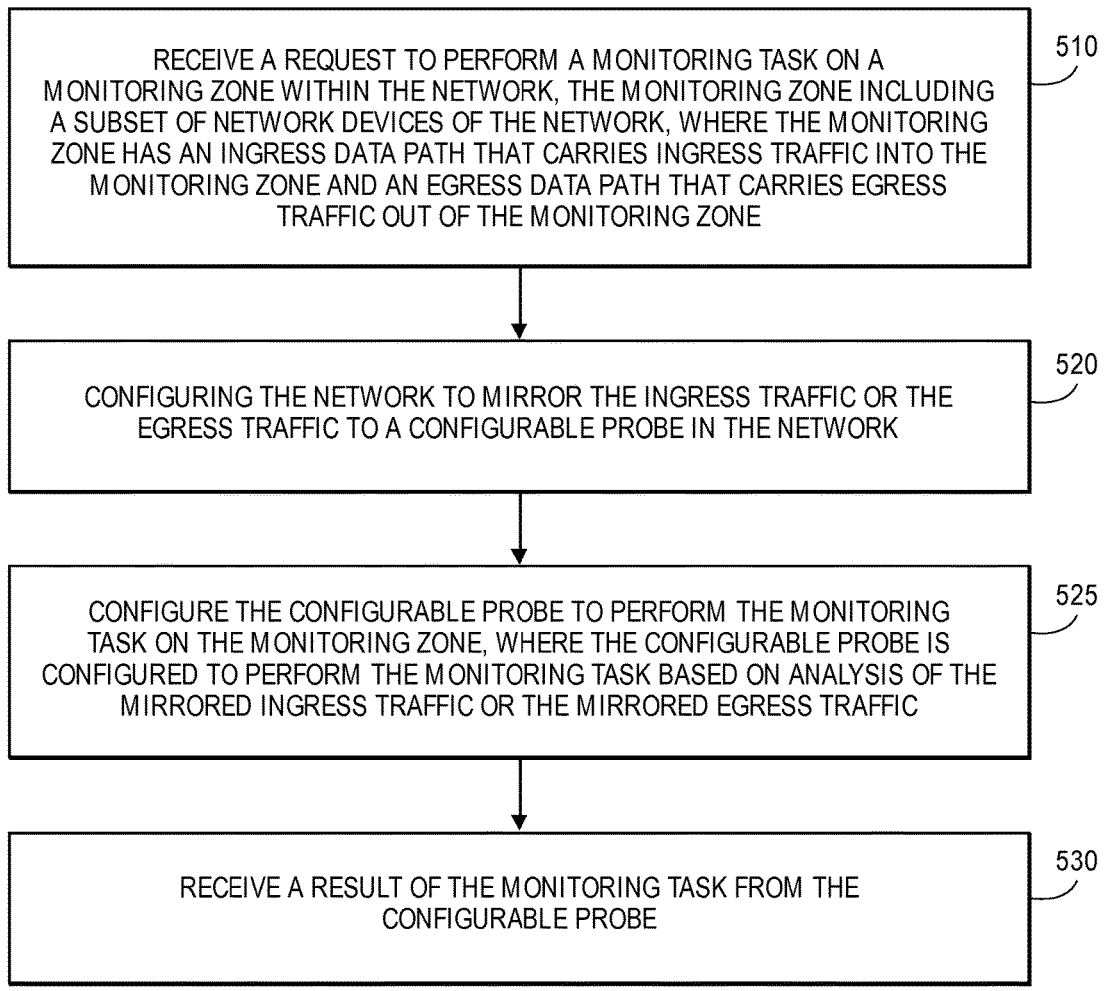
FIG. 5 is a flow diagram illustrating a process for non-intrusive network monitoring, according to some embodiments.

FIG. 5 is a flow diagram illustrating a process for non-intrusive network monitoring, according to some embodiments. In one embodiment, the operations of the flow diagram may be performed by a network device 130 (or a set of network devices) that serves as an SDN controller and/or a cloud manager/orchestrator (e.g., network device 130). The operations in this flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

In one embodiment, the process is initiated when the network device 130 receives a request to perform a monitoring task on a monitoring zone within the network 100 (block 510). The monitoring zone may include a subset of network devices 140 of the network 100 (e.g., that implement a network function such as a traffic blocking function or a traffic passing function). The monitoring zone has an ingress data path that carries ingress traffic into the monitoring zone and an egress data path that carries egress traffic out of the monitoring zone.

The network device 130 configures the network to mirror the ingress traffic or the egress traffic to a configurable probe in the network (block 520). The network device 130 may utilize OpenFlow or a similar communications protocol to configure network devices 140 in the network 100 to mirror the ingress traffic or the egress traffic to the configurable probe. In one embodiment, the configurable probe includes a switch (e.g., ingress switch 220A and egress switch 220B). The network device 130 may configure the network to mirror traffic to the configurable probe by configuring the network 100 to forward a copy of the traffic to a switch of the configurable probe. In one embodiment, the network device 130 may configure the network 100 to forward a copy of all traffic entering and exiting the monitoring zone to a switch of the configurable probe. In another embodiment, the network device 130 may configure the network 100 to forward a subset of the traffic entering and exiting the monitoring zone (e.g., traffic belonging to specific flows) to a switch of the configurable probe. A configurable probe, as used herein, may refer to a virtual probe or a physical probe that can be configured to perform a monitoring task. A virtual probe may include one or more virtual switches for receiving the mirrored ingress traffic into the monitoring zone and/or the mirrored egress traffic out of the monitoring zone. In one embodiment, the network device 130 may initiate instantiation of the one or more virtual switches in the network (e.g., by instructing a network device 140 in the network 100 to instantiate the one or more virtual switches). In one embodiment, the virtual switches are Open vSwitches. By configuring the network to mirror the ingress traffic or the egress traffic to the configurable probe, the configurable probe is able to observe the ingress traffic into the monitoring zone and the egress traffic out of the monitoring zone.

The network device 130 configures the configurable probe to perform the monitoring task on the monitoring zone (block 525). The configurable probe is configured to perform the monitoring task based on analysis of the mirrored ingress traffic or the mirrored egress traffic. In one embodiment, the configurable probe includes one or more monitoring components that each perform a given monitoring task. The network device 130 may configure one or more switches 220 of the configurable probe to forward the mirrored ingress traffic and/or the mirrored egress traffic to one or more of the monitoring components. In one embodiment, the network device 130 configures the one or more switches 220 of the configurable probe to filter the traffic prior to forwarding the traffic to the monitoring components (e.g., only forward traffic belonging to specific flows). The monitoring components may then perform their respective monitoring tasks based on analysis of the mirrored ingress traffic and/or mirrored egress traffic. In one embodiment, the monitoring task is a network function validation task. Examples of a network function validation task include validating whether a traffic blocking function behaves as expected and validating whether a traffic passing function behaves as expected. These network function validation tasks are provided by way of example and not limitation. In other embodiments the network function validation task may validate other types of network functions. In one embodiment, the network device 130 obtains an indication of an expected traffic processing behavior of a network function implemented in the monitoring zone and configures the configurable probe to install a monitoring rule that validates whether the mirrored ingress traffic of the monitoring zone and the mirrored egress traffic of the monitoring zone are consistent with the expected traffic processing behavior of the network function. In one embodiment, the monitoring task is a network profiling task. Examples of a network profiling task include a delay measurement task, a jitter measurement task, and a packet loss measurement task. These network profiling tasks are provided by way of example and not limitation. In other embodiments the network profiling task may profile other characteristics of the traffic in the network 100. In one embodiment, the network device 130 configures the configurable probe to perform the monitoring task by configuring the configurable probe to install one or more monitoring rules. In one embodiment, the network device 130 generates a consolidated monitoring rule by consolidating a plurality of monitoring rules using a bloom filter. The network device 130 then configures the configurable probe to install the consolidated monitoring rule. As discussed above, the consolidated monitoring rule may allow for faster packet matching.

When the configurable probe is finished performing the monitoring task, the configurable probe may send a result of the monitoring task to the network device 130. The network device 130 receives the result of the monitoring task from the configurable probe (block 530), which can be reported to the network monitoring application 150 for further analysis or corrective action (e.g., if the monitoring task detected an abnormality in the network). Since the process monitors a segment (e.g., a monitoring zone) of the network 100 using configurable probes and does not directly access the internal configuration or state of the segment (e.g., configuration of network functions within the segment), the process allows for non-intrusive monitoring with minimal impact on the data path. Also, the process allows for configurable and flexible monitoring where configurable probes can be configured as needed, depending on the desired monitoring task.

Figures 6A, 6B:
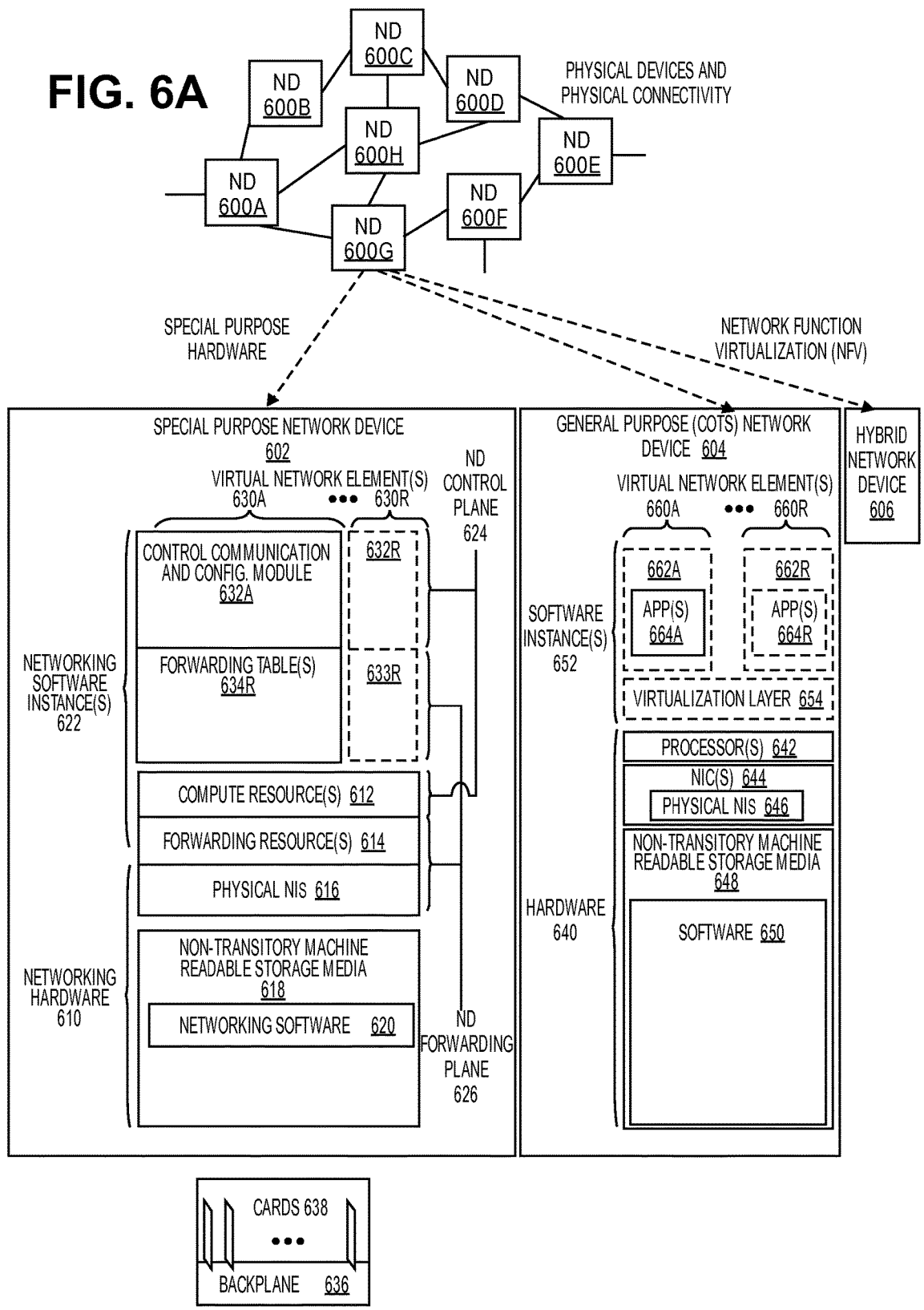
FIG. 6A illustrates connectivity between network devices (NDs) within an exemplary network, as well as three exemplary implementations of the NDs, according to some embodiments.
FIG. 6B illustrates an exemplary way to implement a special-purpose network device according to some embodiments.

FIG. 6A illustrates connectivity between network devices (NDs) within an exemplary network, as well as three exemplary implementations of the NDs, according to some embodiments. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated—circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

Software 620 can include code which when executed by networking hardware 610, causes networking hardware 610 to perform operations of one or more embodiments of the present invention as part of networking software instances 622.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Network Address Translation (NAT), Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

Software 650 can include code which when executed by processor(s) 642, cause processor(s) 642 to perform operations of one or more embodiments of the present invention as part of software containers 662A-R.

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 6C illustrates various exemplary ways in which VNEs may be coupled according to some embodiments. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. In one embodiment, the network controller 678 may include a network monitoring manager component 681 that when executed by the network controller 678, causes the network controller 678 to perform operations of one or more embodiments described herein above.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
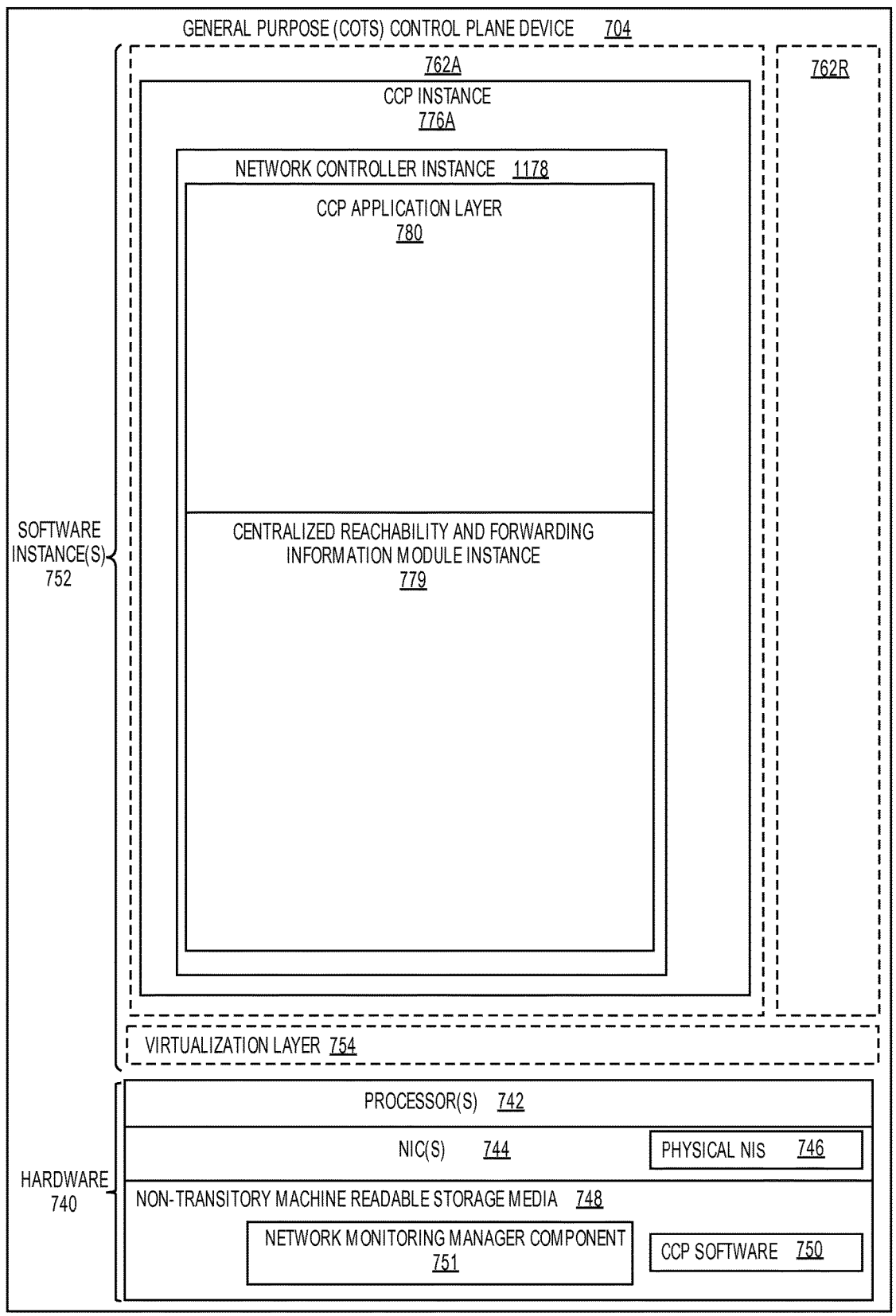
FIG. 7 illustrates a general purpose control plane device with centralized control plane (CCP) software, according to some embodiments.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750 and a network monitoring manager component 751.

In embodiments that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system, and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 750 (illustrated as CCP instance 776A) is executed within the software container 762A on the virtualization layer 754. In embodiments where compute virtualization is not used, the CCP instance 776A on top of a host operating system is executed on the "bare metal" general purpose control plane device 704. The instantiation of the CCP instance 776A, as well as the virtualization layer 754 and software containers 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 676 works with virtual network view(s) (logical view(s) of the network) and the middleware layer provides the conversion from the virtual networks to the physical view.

The network monitoring manager component 751 can be executed by hardware 740 to perform operations of one or more embodiments of the present invention as part of software instances 752.

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a network device in a network for monitoring a segment of the network without direct access to an internal configuration or state of the segment, the method comprising:
   receiving a request to perform a monitoring task on a monitoring zone within the network, the monitoring zone including a subset of network devices of the network, wherein the monitoring zone has an ingress data path that carries ingress traffic into the monitoring zone and an egress data path that carries egress traffic out of the monitoring zone;
   configuring the network to mirror the ingress traffic and the egress traffic to a configurable probe in the network;
   obtaining an indication of an expected traffic processing behavior of a network function implemented in the monitoring zone;
   configuring the configurable probe to install a monitoring rule that validates whether the mirrored ingress traffic and the mirrored egress traffic are consistent with the expected traffic processing behavior of the network function;
   configuring the configurable probe to perform the monitoring task on the monitoring zone, wherein the monitoring task includes a network function validation task, and wherein the configurable probe is configured to perform the network function validation task based on analysis of the mirrored ingress traffic or the mirrored egress traffic using the installed monitoring rule; and
   receiving a result of the monitoring task from the configurable probe.

2. The method of claim 1, wherein the configurable probe includes a switch, and wherein configuring the network to mirror the ingress traffic or egress traffic to the configurable probe comprises configuring the network to forward a copy of the ingress traffic or egress traffic to the switch.

3. The method of claim 2, wherein the configurable probe includes a monitoring component, and wherein configuring the configurable probe to perform the monitoring task comprises configuring the switch to forward the copy of the ingress traffic or the copy of the egress traffic to the monitoring component, wherein the monitoring component is configured to perform the monitoring task based on analysis of the copy of the ingress traffic or the copy of the egress traffic.

4. The method of claim 1, wherein the network function validation task validates whether a traffic blocking function, or a traffic passing function behaves as expected.

5. The method of claim 1, wherein the monitoring task further includes a network profiling task.

6. The method of claim 5, wherein the network profiling task is any one of: a delay measurement task, a jitter measurement task, and a packet loss measurement task.

7. The method of claim 1, further comprising:
   generating a consolidated monitoring rule by consolidating a plurality of monitoring rules using a bloom filter; and
   configuring the configurable probe to install the consolidated monitoring rule.

8. The method of claim 1, wherein the configurable probe is a virtual probe.

9. A network device for monitoring a segment of a network without direct access to an internal configuration or state of the segment comprising:
   a non-transitory machine-readable storage medium having stored therein a network monitoring manager component; and
   a set of one or more hardware processors coupled to the non-transitory machine-readable storage medium, the set of one or more hardware processors configured to execute the network monitoring manager component, the network monitoring manager component configured to
   receive a request to perform a monitoring task on a monitoring zone within the network, the monitoring zone including a subset of network devices of the network, wherein the monitoring zone has an ingress data path that carries ingress traffic into the monitoring zone and an egress data path that carries egress traffic out of the monitoring zone,
   configure the network to mirror the ingress traffic and the egress traffic to a configurable probe in the network,
   obtain an indication of an expected traffic processing behavior of a network function implemented in the monitoring zone,
   configure the configurable probe to install a monitoring rule that validates whether the mirrored ingress traffic and the mirrored egress traffic are consistent with the expected traffic processing behavior of the network function,
   configure the configurable probe to perform the monitoring task on the monitoring zone, wherein the monitoring task includes a network function validation task, and wherein the configurable probe is configured to perform the network function validation task based on analysis of the mirrored ingress traffic or the mirrored egress traffic using the installed monitoring rule, and
   receive a result of the monitoring task from the configurable probe.

10. The network device of claim 9, wherein the configurable probe includes a switch and a monitoring component, and wherein the network monitoring manager component is further configured to
   configure the network to forward a copy of the ingress traffic or a copy of the egress traffic to the switch, and
   configure the switch to forward the copy of the ingress traffic or the copy of the egress traffic to the monitoring component.

11. A non-transitory machine-readable storage medium having computer code stored therein, which when executed by a set of one or more processors of a network device in a network, causes the network device to perform operations comprising:
- receiving a request to perform a monitoring task on a monitoring zone within the network, the monitoring zone including a subset of network devices of the network, wherein the monitoring zone has an ingress data path that carries ingress traffic into the monitoring zone and an egress data path that carries egress traffic out of the monitoring zone;
- configuring the network to mirror the ingress traffic and the egress traffic to a configurable probe in the network;
- obtaining an indication of an expected traffic processing behavior of a network function implemented in the monitoring zone;
- configuring the configurable probe to install a monitoring rule that validates whether the mirrored ingress traffic and the mirrored egress traffic are consistent with the expected traffic processing behavior of the network function;
- configuring the configurable probe to perform the monitoring task on the monitoring zone, wherein the monitoring task includes a network function validation task, and wherein the configurable probe is configured to perform the network function validation task based on analysis of the mirrored ingress traffic or the mirrored egress traffic using the installed monitoring rule; and
- receiving a result of the monitoring task from the configurable probe.

12. The non-transitory machine-readable storage medium of claim 11, wherein the computer code, when executed by the set of one or more processors, causes the network device to perform further operations comprising:
- configuring the network to forward a copy of the ingress traffic or a copy of the egress traffic to a switch of the configurable probe.

13. The non-transitory machine-readable storage medium of claim 12, wherein the computer code, when executed by the set of one or more processors, causes the network device to perform further operations comprising:
- configuring the switch to forward the copy of the ingress traffic or the copy of the egress traffic to a monitoring component of the configurable probe.

14. The non-transitory machine-readable storage medium of claim 11, wherein the network function validation task validates whether a traffic blocking function or a traffic passing function behaves as expected.

15. The non-transitory machine-readable storage medium of claim 11, wherein the monitoring task further includes a network profiling task.

16. The non-transitory machine-readable storage medium of claim 15, wherein the network profiling task is any one of: a delay measurement task, a jitter measurement task, and a packet loss measurement task.

17. The non-transitory machine-readable storage medium of claim 11, wherein the computer code, when executed by the set of one or more processors, causes the network device to perform further operations comprising:
- generating a consolidated monitoring rule by consolidating a plurality of monitoring rules using a bloom filter; and
- configuring the configurable probe to install the consolidated monitoring rule.

18. The non-transitory machine-readable storage medium of claim 11, wherein the configurable probe is a virtual probe.

* * * * *